US009667647B2

(12) United States Patent
Turnbull

(10) Patent No.: US 9,667,647 B2
(45) Date of Patent: *May 30, 2017

(54) DETECTING MALICIOUS RESOURCES IN A NETWORK BASED UPON ACTIVE CLIENT REPUTATION MONITORING

(71) Applicant: Fortinet, Inc., Sunnyvale, CA (US)

(72) Inventor: Darren W. Turnbull, Hook (GB)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,575

(22) Filed: Mar. 11, 2015

(65) Prior Publication Data

US 2015/0188930 A1    Jul. 2, 2015

Related U.S. Application Data

(63) Continuation of application No. 13/476,171, filed on May 21, 2012, now Pat. No. 9,497,212.

(51) Int. Cl.
*H04L 29/06* (2006.01)
*G06F 21/55* (2013.01)

(52) U.S. Cl.
CPC ........... *H04L 63/145* (2013.01); *G06F 21/55* (2013.01); *G06F 21/552* (2013.01); *H04L 63/1425* (2013.01); *H04L 63/20* (2013.01); *G06F 2221/034* (2013.01)

(58) Field of Classification Search
None
See application file for complete search history.

(56) References Cited

U.S. PATENT DOCUMENTS

| 8,214,497 | B2 | 7/2012 | Alperovitch et al. |
| 8,321,943 | B1 | 11/2012 | Walters et al. |
| 8,572,717 | B2 | 10/2013 | Narayanaswamy |

(Continued)

FOREIGN PATENT DOCUMENTS

JP    2010-267161    * 11/2010

OTHER PUBLICATIONS

Final Rejection for U.S. Appl. No. 13/476,171 mailed Oct. 22, 2014.
(Continued)

*Primary Examiner* — Peter Poltorak
(74) *Attorney, Agent, or Firm* — Hamilton, DeSanctis & Cha LLP

(57) ABSTRACT

Systems and methods for detecting malicious resources by analyzing communication between multiple resources coupled to a network are provided. According to one embodiment, a method of client reputation monitoring is provided. A monitoring unit executing on a network security device operable to protect a private network observes activities relating to multiple monitored devices within the private network. For each of the observed activities, a score is assigned by the monitoring unit based upon a policy of multiple polices established within the monitoring unit. For each of the monitored devices, a current reputation score is maintained by the monitoring unit based upon the score and a historical score associated with the monitored device. A monitored is classified by the monitoring unit as potentially being a malicious resource based upon the current reputation score for the monitored device.

23 Claims, 13 Drawing Sheets

(56) References Cited

U.S. PATENT DOCUMENTS

| | | | |
|---|---|---|---|
| 8,584,247 B1* | 11/2013 | Patil | G06Q 10/101 726/25 |
| 8,725,811 B2* | 5/2014 | Srivastava | G06Q 10/109 709/206 |
| 8,726,344 B1* | 5/2014 | Amidon | G06F 7/02 713/168 |
| 9,160,742 B1 | 10/2015 | Ackerman | H04L 63/0853 |
| 2002/0107953 A1 | 8/2002 | Ontiveros et al. | |
| 2002/0158899 A1 | 10/2002 | Raymond | |
| 2003/0217137 A1* | 11/2003 | Roese | G01S 5/02 709/223 |
| 2005/0005169 A1 | 1/2005 | Klekar | |
| 2005/0044224 A1 | 2/2005 | Jun et al. | |
| 2005/0193250 A1* | 9/2005 | Takeuchi | G06F 21/552 714/15 |
| 2006/0015942 A1 | 1/2006 | Judge et al. | |
| 2006/0075506 A1 | 4/2006 | Sanda et al. | |
| 2006/0107318 A1 | 5/2006 | Jeffries et al. | |
| 2006/0212572 A1 | 9/2006 | Afek et al. | |
| 2006/0225131 A1 | 10/2006 | Kinefelter | |
| 2006/0282890 A1 | 12/2006 | Gruper et al. | |
| 2007/0033645 A1 | 2/2007 | Jones | |
| 2007/0107059 A1* | 5/2007 | Chasin | H04L 63/126 726/23 |
| 2008/0005572 A1 | 1/2008 | Moskowitz | |
| 2008/0256619 A1* | 10/2008 | Neystadt | G06F 21/552 726/11 |
| 2008/0262990 A1 | 10/2008 | Kapoor et al. | |
| 2009/0172824 A1 | 7/2009 | Colburn | |
| 2009/0234663 A1 | 9/2009 | McCann et al. | |
| 2009/0300348 A1* | 12/2009 | Aciicmez | H04L 63/08 713/156 |
| 2009/0300720 A1 | 12/2009 | Guo et al. | |
| 2010/0011029 A1 | 1/2010 | Niemela | |
| 2010/0074112 A1 | 3/2010 | Derr et al. | |
| 2010/0180333 A1 | 7/2010 | Bono et al. | |
| 2011/0028107 A1* | 2/2011 | Memik | H04W 48/08 455/114.2 |
| 2011/0093951 A1 | 4/2011 | Aziz | |
| 2011/0296519 A1 | 12/2011 | Ide et al. | |
| 2012/0011589 A1 | 1/2012 | Chen et al. | |
| 2012/0174219 A1* | 7/2012 | Hernandez | G06F 21/562 726/22 |
| 2012/0209970 A1* | 8/2012 | Scipioni | G06Q 30/06 709/223 |
| 2012/0233665 A1* | 9/2012 | Ranganathan | G06F 21/33 726/4 |
| 2012/0240228 A1 | 9/2012 | Alperovitch et al. | |
| 2012/0266230 A1 | 10/2012 | Vanderpol et al. | |
| 2012/0291087 A1* | 11/2012 | Agrawal | G06F 21/55 726/1 |
| 2013/0007870 A1* | 1/2013 | Devarajan | H04L 63/1416 726/11 |
| 2013/0040603 A1* | 2/2013 | Stahlberg | H04L 63/126 455/410 |
| 2013/0097699 A1 | 4/2013 | Balupari et al. | |
| 2013/0179544 A1* | 7/2013 | Sainnsbury | H04L 67/34 709/219 |
| 2013/0298192 A1* | 11/2013 | Kumar | G06F 21/52 726/3 |
| 2013/0298242 A1 | 11/2013 | Kumar et al. | |
| 2013/0312097 A1 | 11/2013 | Turnbull | |
| 2014/0173723 A1* | 6/2014 | Singla | H04L 63/1408 726/22 |
| 2014/0379902 A1* | 12/2014 | Wan | H04L 41/142 709/224 |
| 2015/0150134 A1 | 5/2015 | Turnbull | |
| 2015/0271206 A1* | 9/2015 | Schultz | H04L 63/20 726/3 |

OTHER PUBLICATIONS

Non-Final Rejection for U.S. Appl. No. 13/476,171 mailed Jul. 3, 2014.
Youssef et al. "Dealing with Stateful Firewall Checking" DICTAP 2011, Part I, CCIS 166, pp. 493-507, 2011.
Gu et al. "BotSniffer: Detecting Botnet Command and Control Channels in Network Traffic", In: Proc: NDSS 2008.
Wippich, "Detecting and Preventing Unauthorized Outbound Traffic", SANS Institute InfoSec Reading Room, Oct. 2007.
Zeltser, "Stoppign Malware on its Tracks", http://searchsecurity.techtarget.com/tip/Stopping-malware-in-its-tracks, Mar. 2008.
Takemori et al., "Host-based traceback; Tracking bot and C&C server", ICUIMC-09, Jan. 2009.
Yu et al., "Online botnet detection by continuous similarity monitoring", 978-0-7695-3686-6/09 IEEE, 2009.
Musthaler "More tips on detecting botnet infestation", Network World, Aug.
Juniper Networks Whiter Paper Best Practices for securing Service Provider Networks. Customer Security, Sep. 2008.
Non-Final Rejection for U.S. Appl. No. 13/476,171 mailed May 28, 2015.
Final Rejection for U.S. Appl. No. 13/476,171 mailed Oct. 22, 2015.
U.S. Appl. No. 14/612,896, filed Feb. 3, 2015.

* cited by examiner

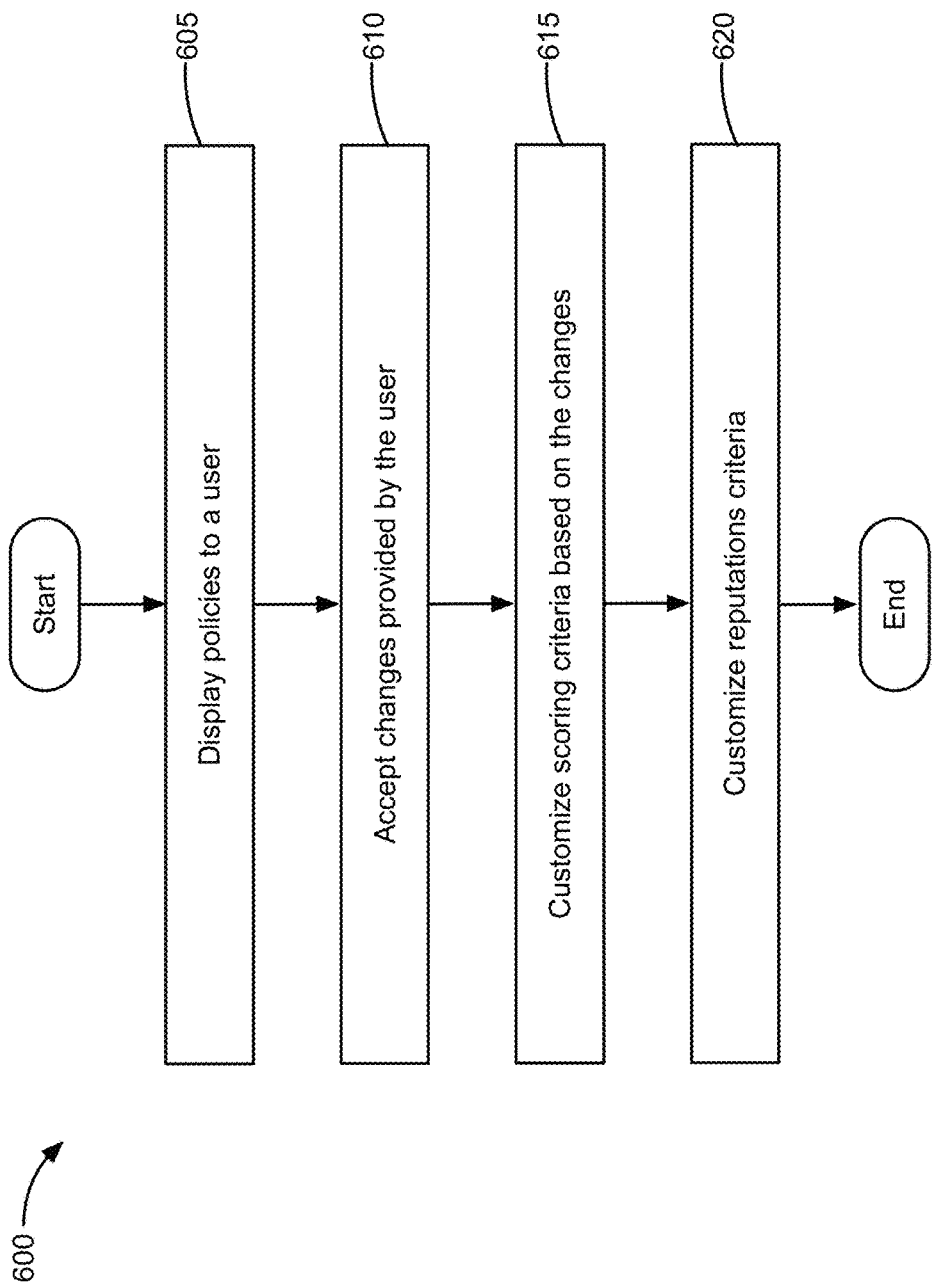

US 9,667,647 B2

DETECTING MALICIOUS RESOURCES IN A NETWORK BASED UPON ACTIVE CLIENT REPUTATION MONITORING

CROSS-REFERENCE TO RELATED APPLICATIONS

This application is a continuation of U.S. patent application Ser. No. 13/476,171, filed May 21, 2012, now U.S. Pat. No. 9,497,212, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to detection of malicious resources. In particular, embodiments of the present invention relate to active unified threat management (UTM) profiling and monitoring of client reputation scores by analyzing communication between a plurality of resources coupled to the network.

Description of the Related Art

In a network, such as a computing network or a telecommunication network, coupled to resources, such as, computers, laptops, mobiles, Personal Digital Assistants (PDAs), virtual server, virtual machines, widgets, and the like, the resources are susceptible to hostile attacks arising as a result of malicious objects such as malware, web robots or BOTS, phishing, modified virus codes, and other viruses. The malicious objects may contaminate resources and initiate risky activities in the network, such as, bad connection attempts, file sharing applications, session initiation for incoming connections, and so forth. Therefore, a resource contaminated with one or more malicious objects may be considered as a malicious resource for the network.

Such malicious resources may further contaminate other resources in the network. Hence, detection of the malicious resources is essential for security and efficient performance of the resources coupled to the network.

A known technique to detect potential malicious resources involves identification of a signature or a representative code pattern within a file or process on the resource being scanned. In this technique, a signature of a file or process at issue is compared with a list of signatures corresponding to malicious objects. If the signature being checked is present in the list of signatures, the resource is or has the potential of becoming a malicious resource. In this technique, the list of signatures must be frequently updated otherwise a lag period between new threats and anticipated signatures may develop. Moreover, this technique is less effective for modified virus codes and targeted attacks like spear phishing.

Another existing technique involves scanning for potential intrusions based on behavior of the resources (e.g., requests involving file sharing or any acts of communication to or from the resources). Such scanning involves dynamic monitoring of internal and external functioning of the resources receiving/sending the requests, and accordingly observing the behavior of the resources. This technique involves heavy processing and like pattern matching can produce false positives and can miss newly developed threats.

In view of the foregoing, there exists a need for new and more effective techniques for detection of malicious resources in the network.

SUMMARY

Systems and methods are described for detecting malicious resources by analyzing communication between multiple resources coupled to a network. According to one embodiment, a method of client reputation monitoring is provided. A monitoring unit executing on a network security device operable to protect a private network observes activities relating to multiple monitored devices within the private network. For each of the observed activities, a score is assigned by the monitoring unit based upon a policy of multiple polices established within the monitoring unit. For each of the monitored devices, a current reputation score is maintained by the monitoring unit based upon the score and a historical score associated with the monitored device. A monitored is classified by the monitoring unit as potentially being a malicious resource based upon the current reputation score for the monitored device.

According to one embodiment, a resource communicates with another resource by exchanging requests over the network. A monitoring unit analyzes these requests based on one or more policies associated with malware activities. The monitoring unit associates a score to a resource during exchange of a request. The score is based on compliance of the resource with the one or more policies.

This score may be consolidated with similar past scores of the resource. The consolidated score of the resource is utilized to identify reputation of the resource. Thereafter, the reputation may be utilized by a user to identify whether the resource includes any malicious object and thereby identify whether the resource is a malicious resource or not.

In an exemplary embodiment, a gateway device may be utilized as a monitoring unit. In this scenario, the gateway device is capable of detecting and monitoring all the requests coming from or going to an external network, such as over Internet to resources in an internal network, such as a Local Area Network (LAN).

Various embodiments of the invention may be enabled by using a graphical user interface (GUI). The GUI includes menus and sub-menus for providing access to the monitoring unit. The menus and sub-menus include information corresponding to policies for malware activities. Further, the menus and sub-menus provide access to scores associated with the policies. The GUI facilitates display of reputation of the resources coupled to the network in form of bar charts and tables which may be viewed by a user. In addition, the GUI may enable a user to customize the policies and the scores for generating reputation.

BRIEF DESCRIPTION OF THE DRAWINGS

Embodiments of the present disclosure are illustrated by way of examples, and not by the way of any limitation, in the figures of the accompanying drawings and in which like reference numerals refer to similar elements and in which:

FIG. 6 is a flow diagram illustrating a method for customizing policies and reputation by a user in accordance with an embodiment of the present invention.

DETAILED DESCRIPTION

Figure 1:
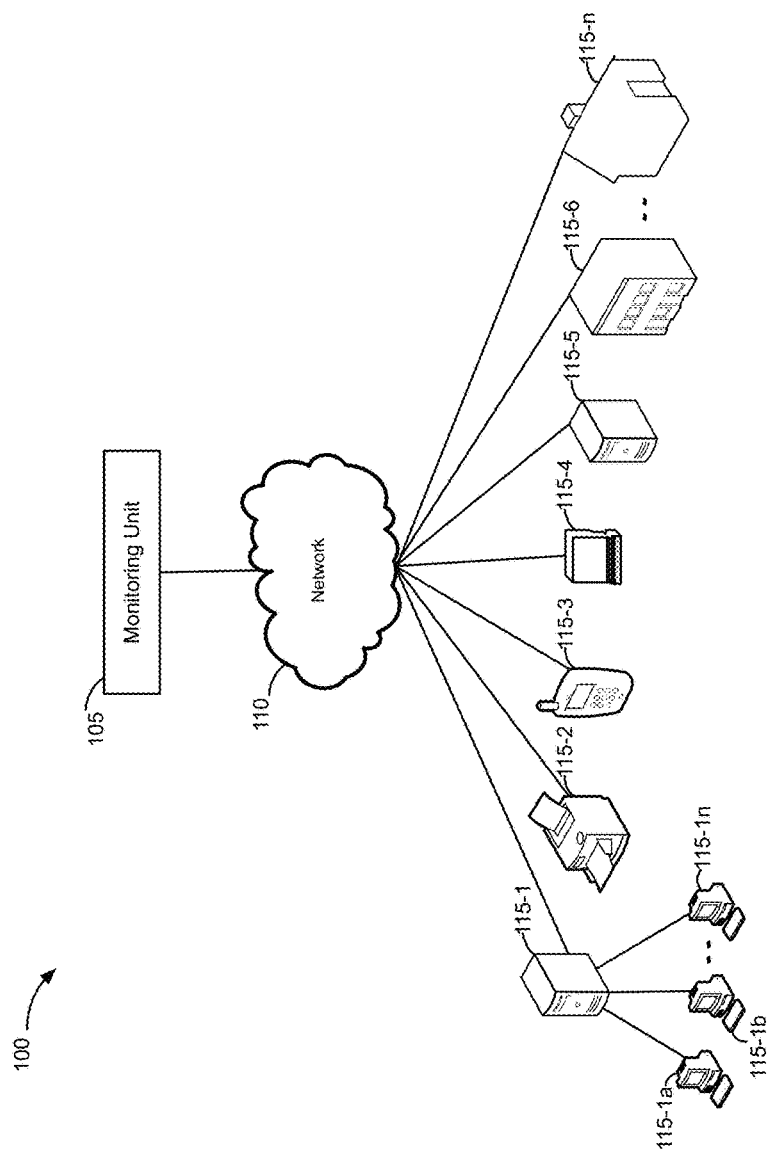
FIG. 1 is a block diagram conceptually illustrating an exemplary environment in which various embodiments of the present invention may be employed.

Systems and methods for detecting malicious resources by analyzing communications between multiple resources in a network are described.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as a File Transfer Protocol (FTP) client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "malicious resource" generally refers to an application program, process or device that includes a malicious object, such as malware, web robot or BOT, phishing, modified virus code and/or other viruses. These malicious objects enable risky activities or policy violations by the malicious resources. The malware or risky activity includes, but is not limited to, program and non-program content, such as computer worms and infected web pages, transmitted to the client terminals through the network, for example, through public or private internet. The policy violation may include, but are not limited to, violation of criteria assigned by the network gateway/administrator. Other examples of risky activities may include bad connection attempts by the resource, accessing information from restricted sites, such as some foreign sites, adult sites, etc., by the resource.

If the specification states a component or feature "may", "can", "could", or "might" be included or have a characteristic, that particular component or feature is not required to be included or have the characteristic.

The phrase "network gateway" generally refers to an inter-networking system, that joins enables entrance to a network. A "network gateway" can be implemented completely in software, completely in hardware, or as a combination of the two. Depending on the particular implementation, network gateways can operate at any level of the Open Systems Interconnection (OSI) model from application protocols to low-level signaling.

The term "reputation" generally refers to evaluation of a resource based on consolidated score corresponding to the resource. The reputation indicates behavior of a resource in relation to malware activities.

The term "resource" generally refers to an application, program, process or device that requests information or seeks services of another program, process or device (a server) in the network.

The term "request" refers to communication message sent from one resource to another resource.

The term "score" generally refers to the rating given to each resource. The score helps in determining whether the resource is malicious or not. The score indicates compliance of a resource with policies. Each malware activity is assigned a base score and this score contributes to the resource's historical or past score whenever the resource undertakes a risky activity. A 'low score' is indicative of high malware activity by the resource or the client and a 'high score' is indicative of low malware activity by the resource or the client. Alternatively a high score could indicate increased malware activity depending on the model adopted, either counting down from an agreed baseline, or counting up to a maximum threshold.

The term "server" generally refers to an application, program, process or device in a client/server relationship that responds to requests for information or services by another program, process or device (a server) on a network. The term "server" also encompasses software that makes the act of serving information or providing services possible.

FIG. 1 is a block diagram conceptually illustrating an exemplary environment 100 in which embodiments of the present invention may be employed. As shown, environment 100 include a network 110 coupled to a number of resources such as, resources 115-1 to 115-n. Examples of network 110 can be a computer network such as, but not limited to, a Local Area Network (LAN), Wide Area Network (WAN), the Internet, a Metropolitan Area Network (MAP), and the like or a mobile network. It may be understood that the mobile network may be a Global System for Mobile (GSM) network, a Code Division Multiplexing Access (CDMA) network, a Public Switched Telephone Network (PSTN), and the like. Network 110 enables communication between the resources in network 110. A resource 115-1 to 115-n can be a device or an application capable of performing various functionalities in network 110. Examples of a resource include, but are not limited to, a server, a personal computer (PC), a printer, a cellular phone, a television, a virtual machine, an office work station, and so forth. In an embodiment, a resource may be a software entity such as a virtual machine or a virtual server. In another embodiment, resource 115-1 to resource 115-n may further be enabled as clients and servers in a client-server environment. In an alternate embodiment, resources 115-1 to resource 115-n may be enabled as senders and receivers in a Pub-Sub environment.

Resources 115-1 to 115-n perform various activities such as communication over network 110 by exchanging requests, such as, requests for file transfer, requests for running an application, requests for establishing connection and the like. For efficient communication in network 110, it is useful that malware activities while exchange of such requests is prevented. In order to achieve this, network 110 is coupled to a monitoring unit 105. Monitoring unit 105 facilitates observing of activities within network 110. Monitoring unit 105 detects various requests exchanged in network 110. Monitoring unit 105 may be implemented as hardware, software, firmware or a combination of these and may be located outside of network 110 or within network 110. Examples of monitoring unit 105 include, but are not limited to, a network gateway, a network interface card (NIC), a router, an Ethernet, a software module, a hub, a virtual machine, a widget and an application.

Monitoring unit 105 may communicatively be coupled to a server (not shown). The server enables processing required by monitoring unit 105 and storage of data collected by monitoring unit 105. Apart from the server, monitoring unit 105 is communicatively coupled to resources 115-1 to 115-n. Monitoring unit 105 is configured to detect and analyze the requests exchanged by resources 115-1 to 115-n. Each request exchanged among resources 115-1 to 115-n is listened/observed by monitoring unit 105. Monitoring unit 105 analyses the request from each of these resources 115-1 to 115-n based on one or more pre-defined policies corresponding to resources 115-1 to 115-n. The policies may be based on geography of the resource initiating the request, the type of request, required application, session event, application event, interaction with various websites, and so forth. These one or more policies may be defined by a user (or network administrator), or a resource or network 110 for observing various malware activities. Monitoring unit 105 is configured to associate or provide a score to each resource coupled to the network based on the policies. Monitoring unit 105 is also configured to store the score related information corresponding to each resource in a database at the server. In an exemplary scenario, the database may include score for resources 115-1 to 115-n based on the previous request exchanges among resources 115-1 to 115-n. Then, the newly associated score may be aggregated with one or more past scores of the resource. The score can be numeric, alphabets, symbols, or combination of these. Based on the aggregated score for each resource, a reputation of the resource is identified. The reputation may be such as, but not limited to, good, bad, safe, harmless, vulnerable, harmful, moderate, and so forth. The reputation indicates whether a resource is malicious or safe. In an exemplary scenario, when reputation of the resource is identified as bad then the resource may be found as a malicious resource. However, if the reputation of the resource is identified as good, the resource may be considered as a safe resource. Therefore, monitoring unit 105 facilitates classification of devices in network 110 based on reputation.

In an embodiment, identification of the reputation may be done manually by the user or the network administrator or a programmer. The user may identify the reputation for each resource of resources 115-1 to 115-n by reading the score related information or log stored in the database. In an alternate embodiment, the reputation may be generated automatically based on one or more predefined rules specified by the user. The rules may be like if the score is less than a threshold value then the reputation for the resource is set as "bad" and otherwise as "good". For example, if the score for a resource 115-1 is "−10", then resource 115-1 is considered to be a bad resource. The user may change the rules or the threshold value over a period of time. The method of detection of malicious resources in the network and various system elements are explained in detail in the following figures.

Figure 2:
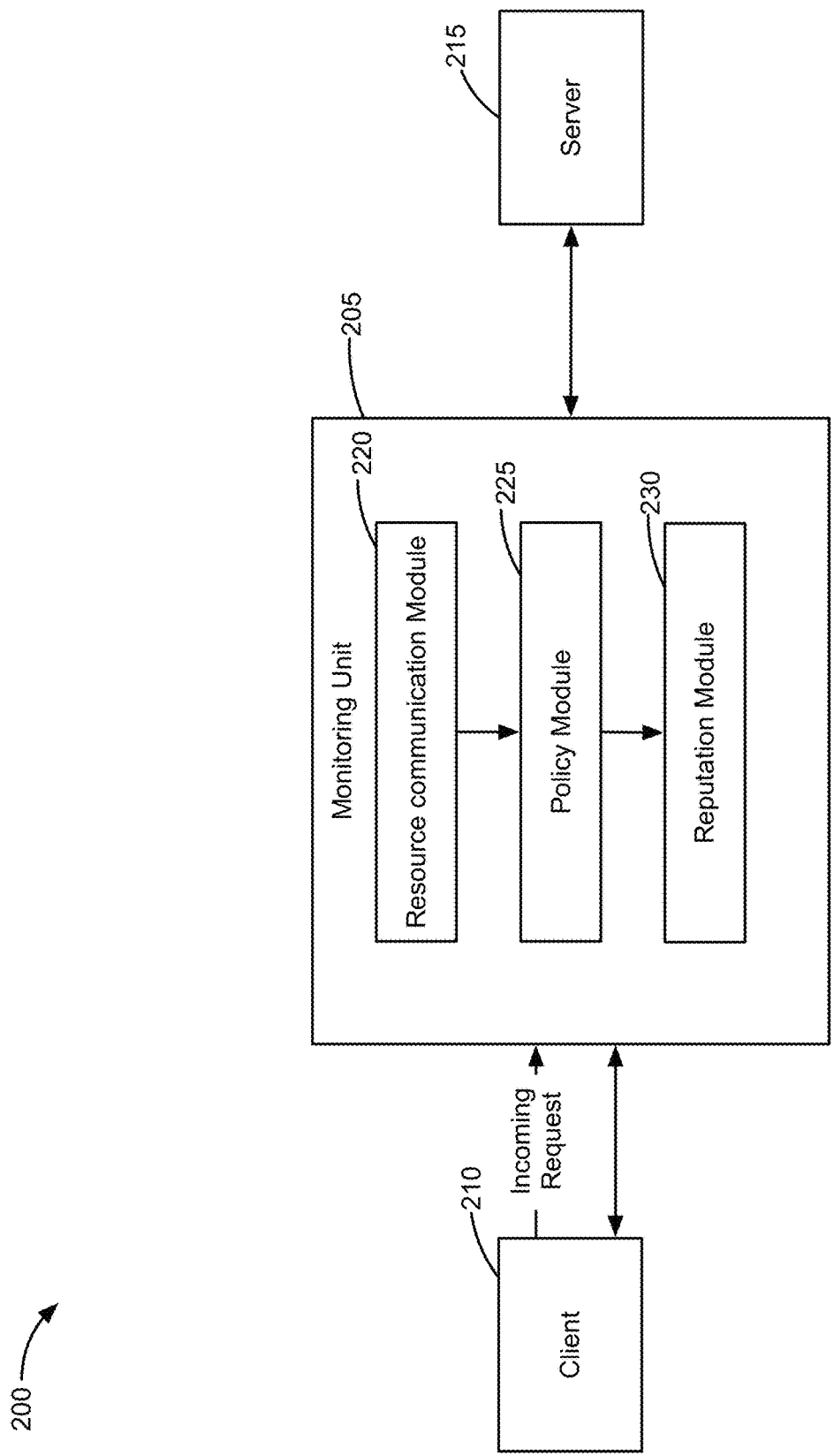
FIG. 2 is an exemplary system diagram in accordance with an embodiment of the present invention.

FIG. 2 is an exemplary system diagram in accordance with an embodiment of the present invention. As discussed with reference to FIG. 1, resources 115-1 to 115-n may include client and servers in a client-server environment. A system 200 includes a client 210 capable of communicating with a server 215 by sending and receiving requests. All the requests are visible to a monitoring unit 205. While in this simplified example, only a single client, i.e., client 210, and a single server, i.e., server 215, are shown as being monitored by monitoring unit 205, it should be understood that system 200 may include more than one client and that may interact directly or indirectly with monitoring unit 205 and directly or indirectly with each other. Client 210, monitoring unit 205, and server 215 are connected to each other through a network (not shown), such as an enterprise network or the Internet. Further, the client and the server may be physical or logical devices or one or more applications running on a device in the network. Monitoring unit 205 is capable of actively snooping/sniffing to observe or detect and analyze the requests sent by client 210 to server 215 for malware activities. Thus, monitoring unit 205 acts as an active listener. The step of observing may include one or more of performing packet-based inspection of network communications to or from client 210, performing flow-based inspection of the network communications and performing proxy based inspection of the network communications. The packet-based inspection includes identifying one or more of indications relating to blockage by a firewall associated with the network, indications regarding failed Domain Name Server (DNS) resolution and indications regarding DNS resolution to undesired sites. Whereas, the flow-based inspection includes observing client 210 accepting a connection request from a device located outside of the network.

Monitoring unit 205 detects a request from client 210. The request may be an attempt by client 210 to establish a connection with server 215. Alternately, the request may be a command to execute a function or application on server 215. Upon detection of the request, monitoring unit 205 analyzes client 210. Monitoring unit 205 includes one or more modules for performing the analysis. Monitoring unit 205 includes a resource communication module 220, a policy module 225, and a reputation module 230.

Resource communication module 220 is configured to establish communication with client 210 for obtaining client-specific information. Client-specific information is typically useful in connection with identifying behavior of client 210. Examples of client-specific information may include, but are not limited to, an Internet Protocol (IP) address, Media Access Control (MAC) address, Device Type or name of the end user utilizing client 210. The IP or MAC address is utilized for identification of client 210. Further, the IP or MAC address may be utilized for identifying additional information, such as geographical location of client 210. This client-specific information is also useful for logging data corresponding to client 210 for multiple requests made by client 210 to server 215. The log may be maintained at a database associated with monitoring unit 205. The database may be internal or external to monitoring unit 205. In an embodiment, the database may be present at another device in the network such as a monitoring server (not shown). Other examples of the client-specific information corresponding to client 210 may include a type of network connection between client 210 and server 215, speed of the network connection, Hypertext Transfer Protocol (HTTP) 404 error corresponding to request made by client 210, and application corresponding to the request made by client 210. The information is retrieved by monitoring unit 205 from the request detected from client 210. Further, the client-specific information may be retrieved by establishing communication with client 210.

In one embodiment, every piece of client-specific information corresponding to client 210 is retrieved by resource communication module 220. In an alternate embodiment, a set or a part of such client-specific information may be retrieved corresponding to client 210, based on preferences of a user. For example, the user may prefer to obtain information which involves low overhead in retrieval. For example, identification of geographical location and type of network connection involves low overhead. However, identification of HTTP 404 error and application corresponding to the request involves high overhead. Therefore, the user may prefer to obtain information with low overhead.

The information corresponding to client 210 is helpful in obtaining behavior of client 210. For example, if client 210 is sending continuous requests for visiting adult websites then this may result in a negative or a less score for client 210 and thereby a "bad" reputation may be associated with client 210. Similarly, requests with HTTP 404 error may signify bad behavior of client 210.

The client-specific information obtained by resource communication module 220 is passed to policy module 225. Policy module 225 includes a number of policies for analyzing behavior of client 210. The policies are predefined rules for identifying perceived risky activities. The policies may be defined by the user (e.g., the network administrator) via browser-based interface provided by a network gateway device or via a command line interface provided by the network gateway device. The policies may also be network or system defined. Alternately, the policies may be obtained from predefined standards, for example, based on Unified Threat Management (UTM) Profiles. For example, the policies may include a policy for connection attempts. A request that requires connection with a client non-existent over the Internet may result in a bad connection attempt. Therefore, a policy may indicate such a scenario as a perceived risky activity potentially indicative of malware activity by associating such a result with a negative score. Similarly, a policy may define that looking up of Domain Name Server (DNS) name that does not exist as a perceived risky activity potentially indicative of malware activity. Other examples of policies defining perceived risky activities indicative of potential malware activity may include, application events, interactions with hosts in certain geographic locations, connecting to an IP address that has no route, HTTP 404 error, a client with Peer-to-Peer file sharing, session events and interactions with particular types of sites.

According to one embodiment, the policies are utilized for associating a reputation score with client 210. Based on compliance with the policies, on an activity-by-activity basis, the reputation score for client 210 may be updated. Therefore, information retrieved by resource communication module 220 is utilized for identifying compliance of client 210 with the policies. In an embodiment, the reputation score is defined as a good score or a bad score based on the compliance with the policy. In another embodiment, the score is a numerical value selected from a range of numerical values based on compliance with the policies. For example, a score from a range of 1-100 may be given based on how compliant the monitored host system is with established policies. In some embodiments, the score may be a negative numeric value.

In another embodiment, one or more policies are selected from the multiple policies to obtain a profile of client 210. The one or more policies may be selected by a user. Alternately, the one or more policies may be selected based on a predefined profile. For example, policies included in standard profile for Unified Threat Management (UTM) may be selected. An interface may be provided for selection or de-selection of a policy from the policies. Therefore, the user may obtain a customized profile of client 210 based on the required policies. Similarly, the user may adjust scores corresponding to a policy based on these requirements. For example, consider a scenario in which a policy assigns a score of −10 for every 1 MB of data transferred to a client in Russia from a server in United States of America. A user administrating the policies may realize that a person sending such a request is a Russian origin residing in the USA. Therefore, the user may de-select this policy from the profile or the user may reduce the score to −1.

The one or more policies selected for defining a profile of client 210 are utilized by reputation module 230 to associate a reputation score with client 210 based on an aggregate score corresponding to the policies included in the profile of client 210. Reputation module 230 collects scores associated with each policy in the profile of client 210. Further, reputation module 230 may include past and/or historical scores corresponding to client 210 based on the past requests detected from client 210. The past scores are associated with past requests made by client 210 to server 215. It should be noted that the historical score may be reset on a periodic basis wherein the period is configurable by a network administrator. The reputation of client 210 is determined based on the consolidated score of client 210. The reputation may indicate behavior of client 210 for malware activities and a tendency for being a malicious resource. In an embodiment, a predefined level of negative or low score may indicate a bad reputation for client 210. Similarly, a predefined level of positive or high score may indicate a good or safe reputation for client 210. Further, if client 210 has a score lying between these two predefined levels then client 210 may be deemed as neutral meaning that client 210 requires more monitoring before determining a good or a bad reputation. The predefined levels may be defined by the user.

In one embodiment, reputation module 230 may indicate or report reputation of client 210 in form of bars and charts to a user. These reports may be retrieved by the user as per his preference or requirement or in a periodic manner. Based on the reputation, the user may identify client 210 as a malicious resource and may take further actions. Therefore, a user receives regular updates about behavior of client 210 or multiple clients in the network. Further, the user can customize various policies and scores corresponding to client 210. As a result, the reputation obtained for client 210 is based on relevant factors and obsolete or un-required factors are removed in a timely manner.

Figure 3:
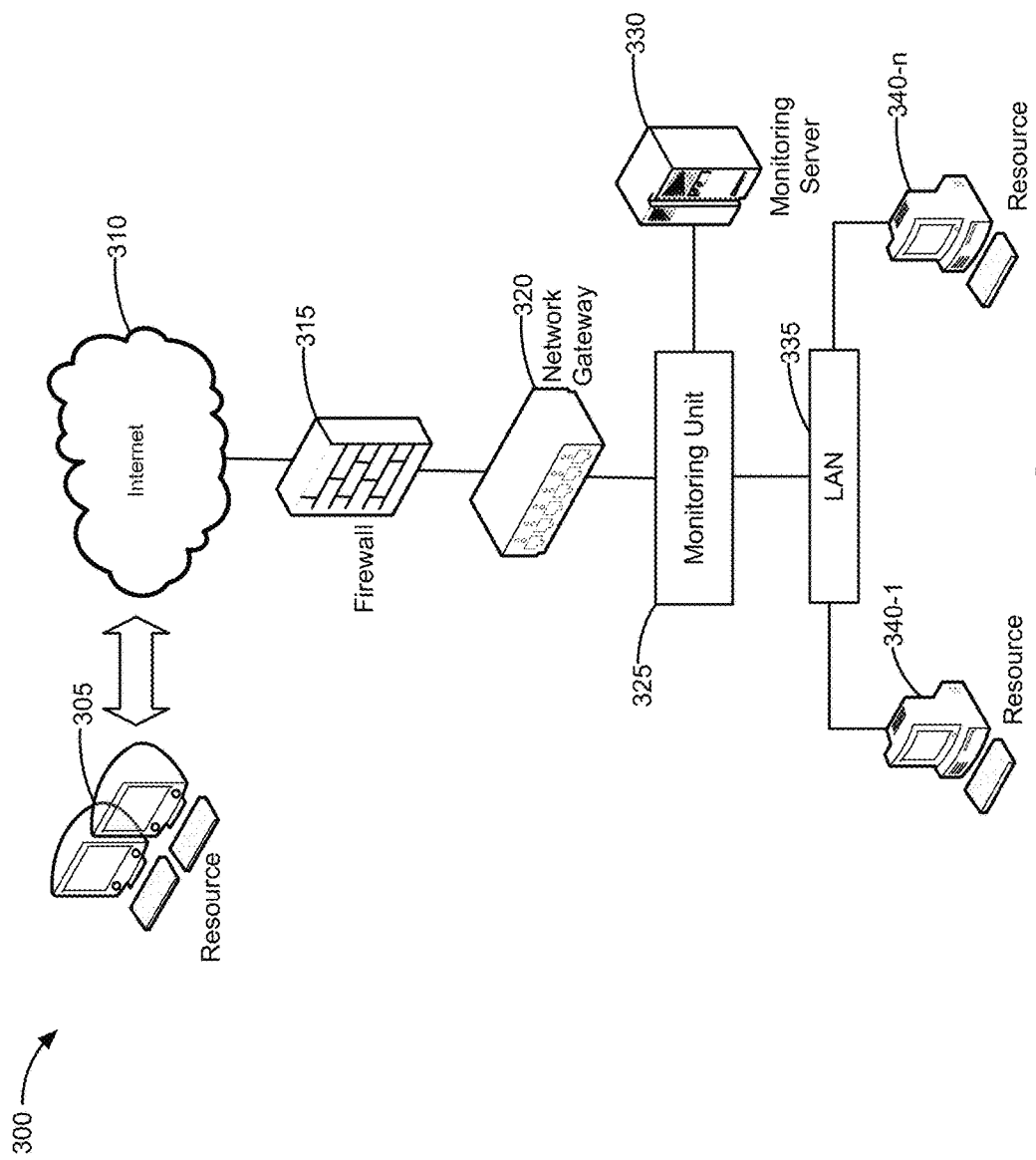
FIG. 3 is another exemplary environment in which various embodiments of the present invention may be employed.

FIG. 3 is another exemplary environment 300 in which various embodiments of the present invention may function. Environment 300 includes a resource 305 coupled to a network such as Internet 310. Internet 310 may be further coupled to a local area network (LAN) 335 through a firewall 315 and a network gateway 320. In the exemplary environment 300, firewall 315 may represent a hardware or software solution configured to protect the resources of LAN 335 from outsiders and to control access by enforcing security policies. Firewall 315 may filter or disallow unauthorized or potentially harmful content or requests from entering LAN 335 and may otherwise limit access between LAN 335 and Internet 310.

In an embodiment, network gateway 320 may act as an interface between LAN 335 and Internet 310. Network gateway 320 may, for example, translate between dissimilar protocols used internally and externally to LAN 335. Depending upon the distribution of functionality, network gateway 320 or firewall 315 may perform network address translation (NAT) to hide private Internet Protocol (IP) addresses used within LAN 335. Network gateway 320 or firewall 315 may enable multiple resources, such as resource 340a, resource 340b, and resource 340n, to access Internet 310 using a single public IP address.

In one embodiment, firewall 315 and network gateway 320 may enable secure and authorized communication between Internet 310 and LAN 335 using a monitoring unit 325. Monitoring unit 325 is coupled to network gateway 320 to prevent malware activities at LAN 335 from the external network i.e. Internet 310. Monitoring unit 325 interacts with a monitoring server 330 to enable desired processing. Functionalities and modules of monitoring unit 325 are explained in detail in conjunction with FIG. 1 and FIG. 2.

In an embodiment, monitoring unit 325 may manage requests for all the clients or resources in LAN 335. Therefore, monitoring unit 325 acts as a central entity which observes requests to and/or from all resources 340a to 340n. Upon detection of any request, monitoring unit 325 identifies associated reputation of the client sending the request such as client 340a. Monitoring unit 325 may maintain a log of reputation of all resources 340a to 340n that sends requests to external resources such as devices or application which are not part of LAN 335. Monitoring unit 325 may include a database for storing the log or record including the reputation and scores of resources 340a to 340n or other devices of environment 300. In addition, monitoring unit 325 may provide reputation data corresponding to each client to a database associated to the client. In an alternate embodiment, each resources 340a to at LAN 335 may maintain a dedicated monitoring unit similar to monitoring unit 325. The dedicated monitoring unit may observe requests directed to only corresponding client. In another embodiment, monitoring unit 325 may reside at any device in the Internet or LAN 335. In yet another embodiment, monitoring unit 325 may monitor application activity for a client by activating one or more of application launch control and application activity control within the client.

Figure 4:
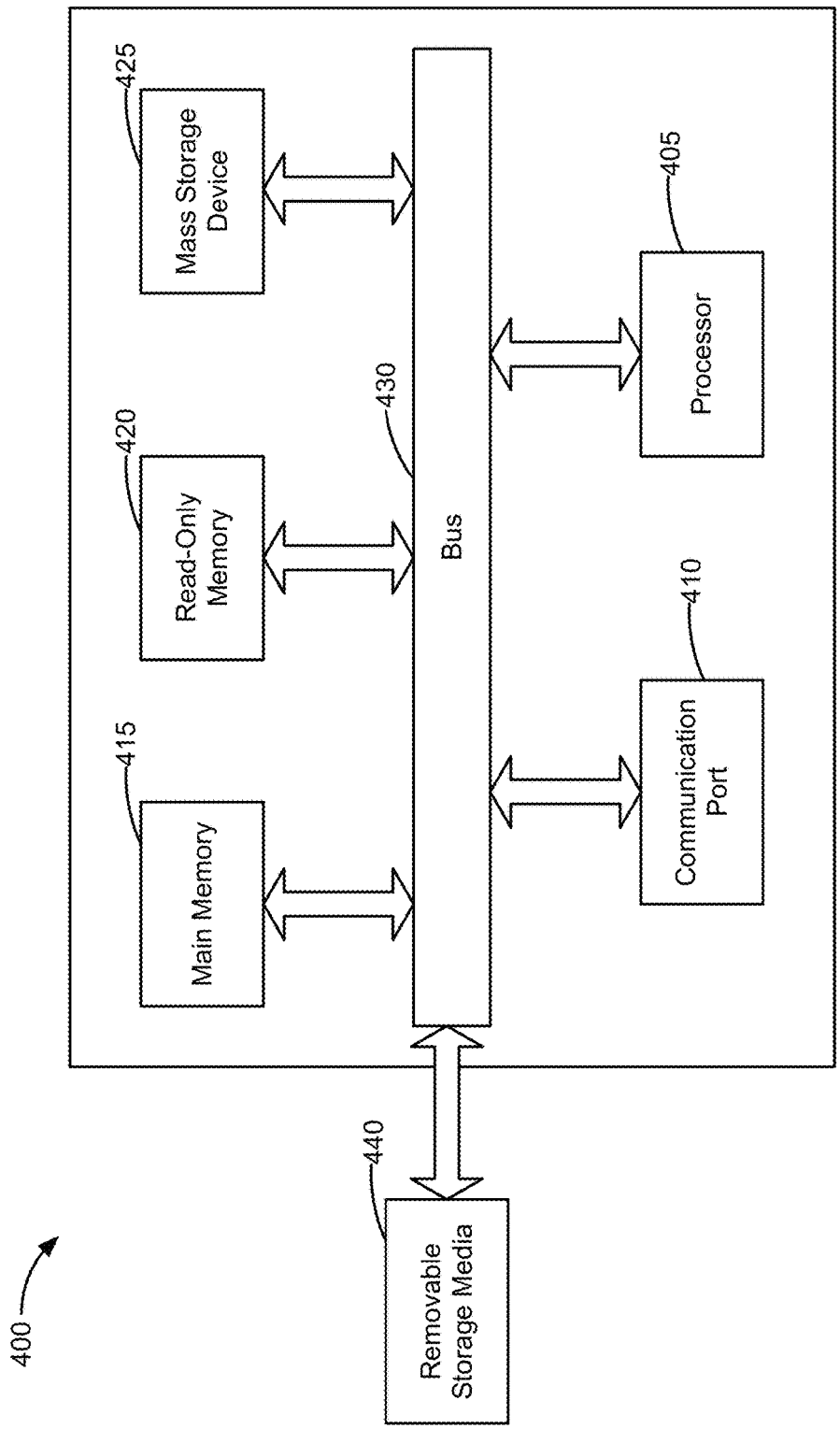
FIG. 4 is an exemplary computer system with which embodiments of the present disclosure may be utilized.

FIG. 4 is an example of a computer system 400 with which embodiments of the present disclosure may be utilized. Computer system 400 may represent or form a part of a monitoring unit, a network gateway, a firewall, a network appliance, a switch, a bridge, a router, data storage devices, a server, a client workstation and/or other network device in a network.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 400 includes a bus 430, a processor 405, communication port 410, a main memory 415, a removable storage media 440, a read only memory 420 and a mass storage 425. A person skilled in the art will appreciate that computer system 400 may include more than one processor and communication ports.

Examples of processor 405 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 405 may include various modules associated with monitoring unit as described in FIG. 2. Processor 405 may include resource communication module 220 for establishing communication with resources coupled to the network. Processor 405 may further include policy module 225 for including various policies and scoring schemes. In addition, processor 405 may include reputation module 230 for generating reputation of the resources coupled to the network.

Communication port 410 can be any of an RS-232 port for use with a modem based dialup connection, a 10/100 Ethernet port, a Gigabit or 10 Gigabit port using copper or fiber, a serial port, a parallel port, or other existing or future ports. Communication port 410 may be chosen depending on a network, such a Local Area Network (LAN), Wide Area Network (WAN), or any network to which computer system 400 connects.

Memory 415 can be Random Access Memory (RAM), or any other dynamic storage device commonly known in the art. Read only memory 420 can be any static storage device(s) such as, but not limited to, a Programmable Read Only Memory (PROM) chips for storing static information such as start-up or BIOS instructions for processor 405.

Mass storage 425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 430 communicatively couples processor(s) 405 with the other memory, storage and communication blocks. Bus 430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 405 to system memory.

Optionally, operator and administrative interfaces, such as a display, keyboard, and a cursor control device, may also be coupled to bus 430 to support direct operator interaction with computer system 400. Other operator and administrative interfaces can be provided through network connections connected through communication port 410.

Removable storage media 440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Figure 5:
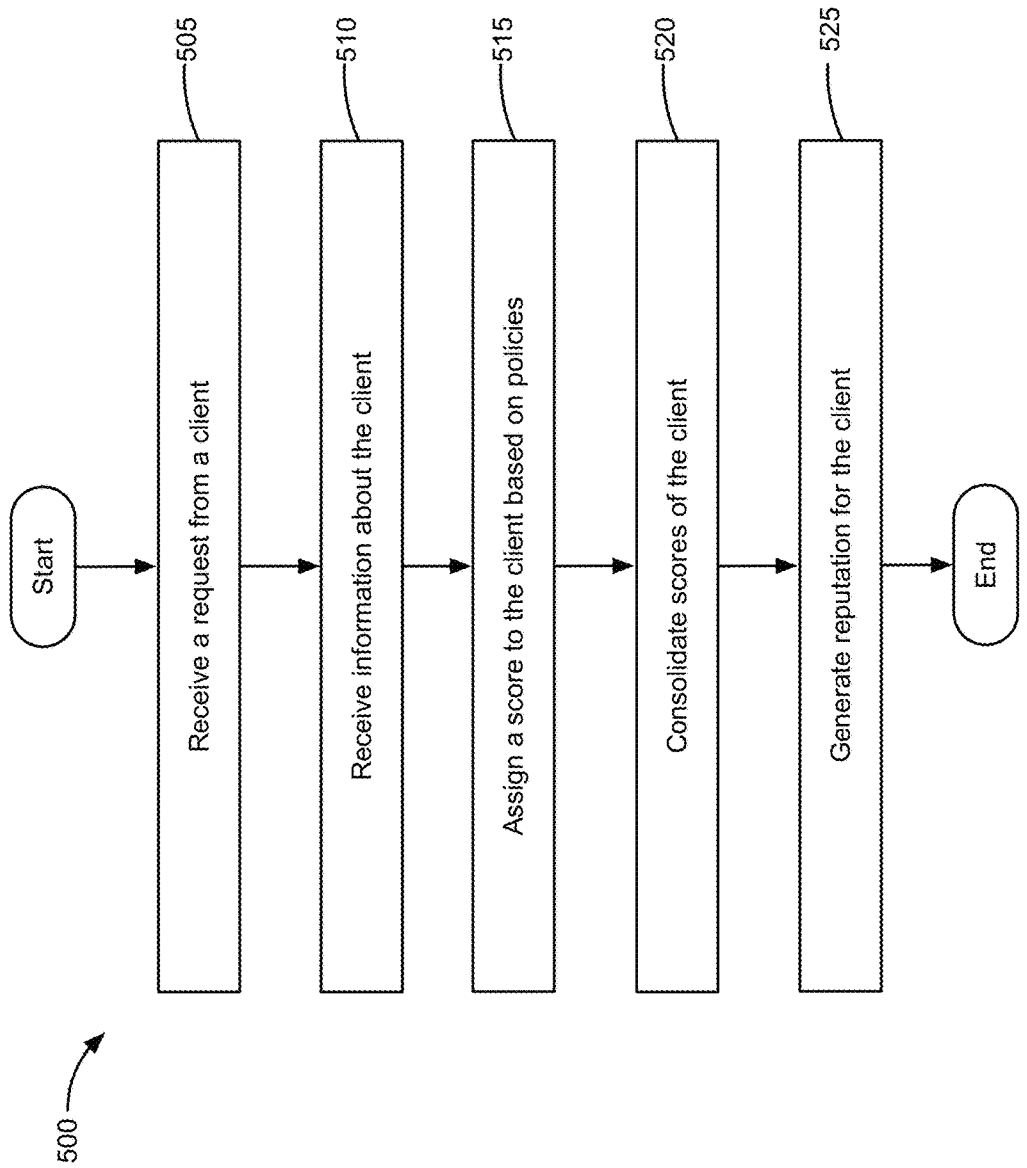
FIG. 5 is a flow diagram illustrating a method for detection of malicious resources in accordance with an embodiment of the present invention.

FIG. 5 is a flow diagram illustrating a method for detection of malicious resources in accordance with an embodiment of the present disclosure. At block 505, a request from a resource such as a client coupled to a network is detected by a monitoring unit. The request is directed for another resource, such as a server coupled to the network. The resources client, server, and monitoring unit have been explained in detail in conjunction with FIG. 1 to FIG. 4. The client and the server are the resources capable of communicating via requests in the network. The request may relate to establishment of a connection with the server or concern execution of a command at the server, for example. Based on the disclosure contained herein, those of ordinary skill in the art will recognize various other types of requests that may be detected, analyzed and scored.

Upon detection of the request, information corresponding to the client is received at block 510. In an embodiment, the information may be obtained by establishing communication with the client. For example, communication may be established between the client and the monitoring unit to identify an application corresponding to the request. Similarly, communication may be established to identify whether the client performs Peer-to-Peer file sharing. In an alternate embodiment, the information may be obtained by observing one or more details associated with the request. For example, information such as an IP address, geographical location of the client, application and strength of connection between the client and the server may be obtained based on the request or may be otherwise derived based on information associated with the request.

The information corresponding to the client is analyzed corresponding to multiple policies. The policies are defined to analyze behavior of the client and to measure the types of number of perceived risky activities performed by the client. Based on the information, compliance of the client for the multiple policies is observed. Accordingly, a score is assigned to the client at block 515. The score may be obtained by assigning individual scores to each policy of the multiple policies, and then aggregating the individual scores. Examples of the policies and the score are explained in detail in conjunction with FIG. 2.

Thereafter, at block 520, the score assigned based on the request is aggregated with a past score (if any) of the client. The past score is an aggregation of the scores assigned to the client for requests made in past. The past score may correspond to all the requests made in past. Alternately, the past score may correspond to requests made in a pre-defined and/or configurable period of time, such as within the last week, month, and so forth in the past. The past score is logged in a database at the monitoring unit or at any other device or monitoring server in the network. Further, upon receipt of the request, the past score is consolidated with the latest assigned score. Therefore, a consolidated score for the client is obtained.

The consolidated score is utilized for determining a reputation of the client at block 525. The reputation indicates behavior of the client in relation to perceived risky activities associated with potential malware and a tendency for being a malicious resource. In an embodiment, a predefined level of negative or low score may indicate a bad reputation for a client. Similarly, a predefined level of positive or high score may indicate a good or safe reputation for a client. The level may be defined by the user or network administrator.

The reputation of the client is utilized by the user to identify malicious client or resources in the network. At periodic intervals or randomly, the user may check reputation of various clients in the network. Based on the reputation, the user may report one or more clients as malicious resources. For example, client having a bad reputation or a reputation level below a predefined level may be defined as malicious resources. Therefore, further requests from these malicious resources may be avoided and any malware activity in the network may be prevented.

FIG. 6 is a flow diagram illustrating a method for customizing policies and reputation by a user. The user may be a network administrator or a programmer who is responsible for administering malware activities in a network. The disclosed method enables the user to monitor and customize various policies and scoring schemes based on latest activities occurring within/over the network. At block 605, a number of policies are displayed to the user. The policies are displayed to the user to inform about rules related to various perceived risky activities that may be enabled by, initiated by or otherwise associated with a malware infection, for example. The policies may be displayed at a display interface associated with a monitoring unit. The user may check the policies and select appropriate/desired policies for detection of malware activities. Selection of the policies may be based on various factors. For example, a user may deselect obsolete policies. Further, the user may select policies relevant to a particular geographical area. Selection of the policies may also be based on requirements of the network, and so forth.

The user may select or deselect any policy by utilizing an input interface related to the monitoring unit. Further, the user may also provide inputs about scores associated with one or more policies. The user may define levels of the scores based on compliance of the one or more policies. Further, changes are accepted in the policies based on the inputs received from the user at block 610.

Thereafter, customization of the scores for each policy is done based on the selected policies, at block 615. Scores associated with each selected policy are defined. Further, criteria for defining reputation based on the scores are customized at block 620. The user inputs are utilized for pre-setting required profile for accessing behavior of client in the network.

In light of the above method the user may access various settings of a unit involved in monitoring malicious resources, such as the monitoring unit. Manual inputs by the user are advantageous in incorporating various factors which cannot be updated automatically for monitoring malicious resources. Therefore, efficient customization of the monitoring unit is done.

FIG. 7A-7E illustrate an exemplary graphical user interface (GUI) of system for detecting malicious resources, in accordance with an embodiment of the present disclosure. The GUI includes menus and sub-menus for managing parameters and policies corresponding to network security. Further, the GUI provides various views for demonstrating reports corresponding to malware activities.

Figure 7A:
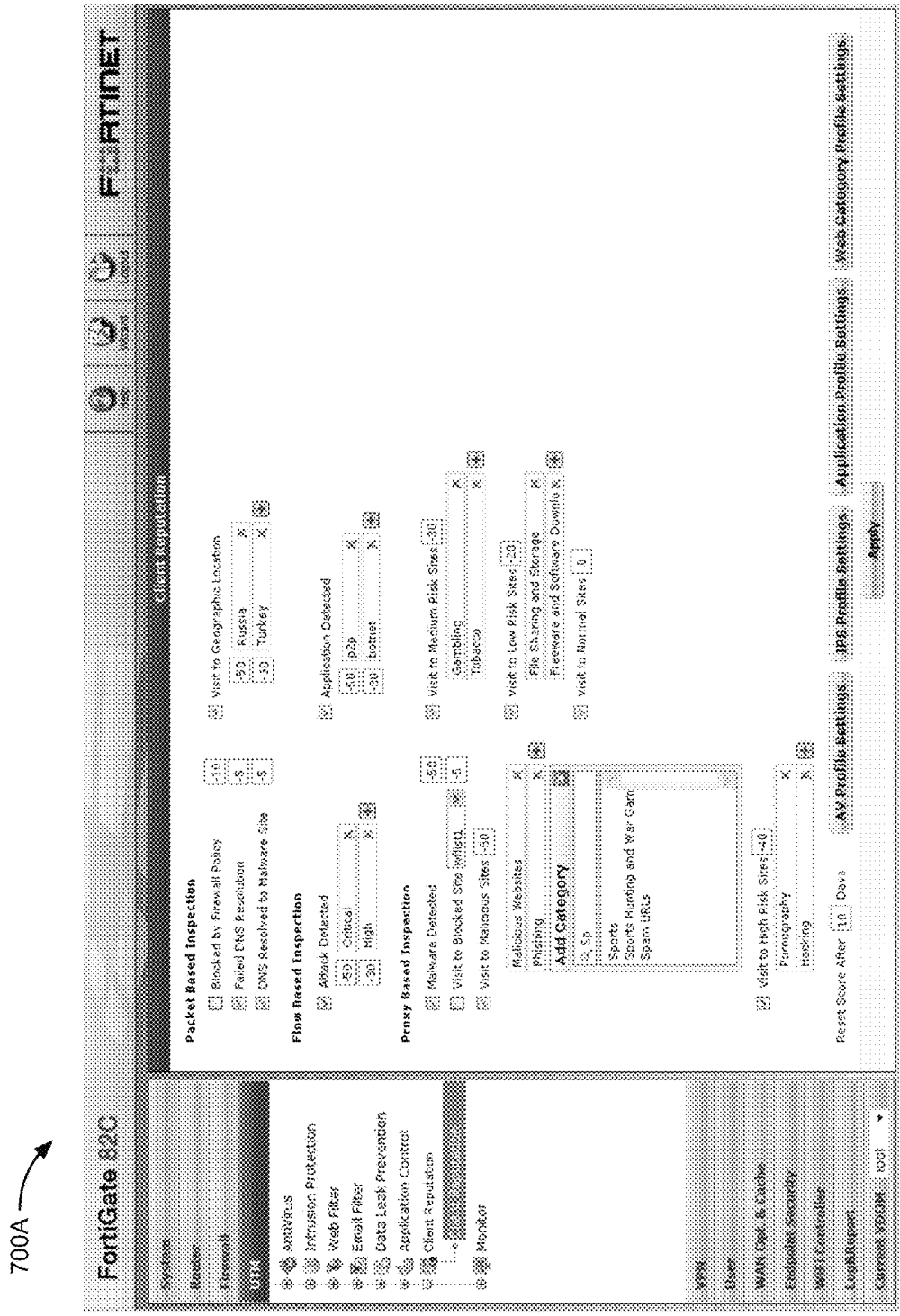
FIGS. 7A-7E illustrate exemplary graphical user interface pages to support detection of the malicious resources in accordance with an embodiment of the present invention.
Figure 7B:
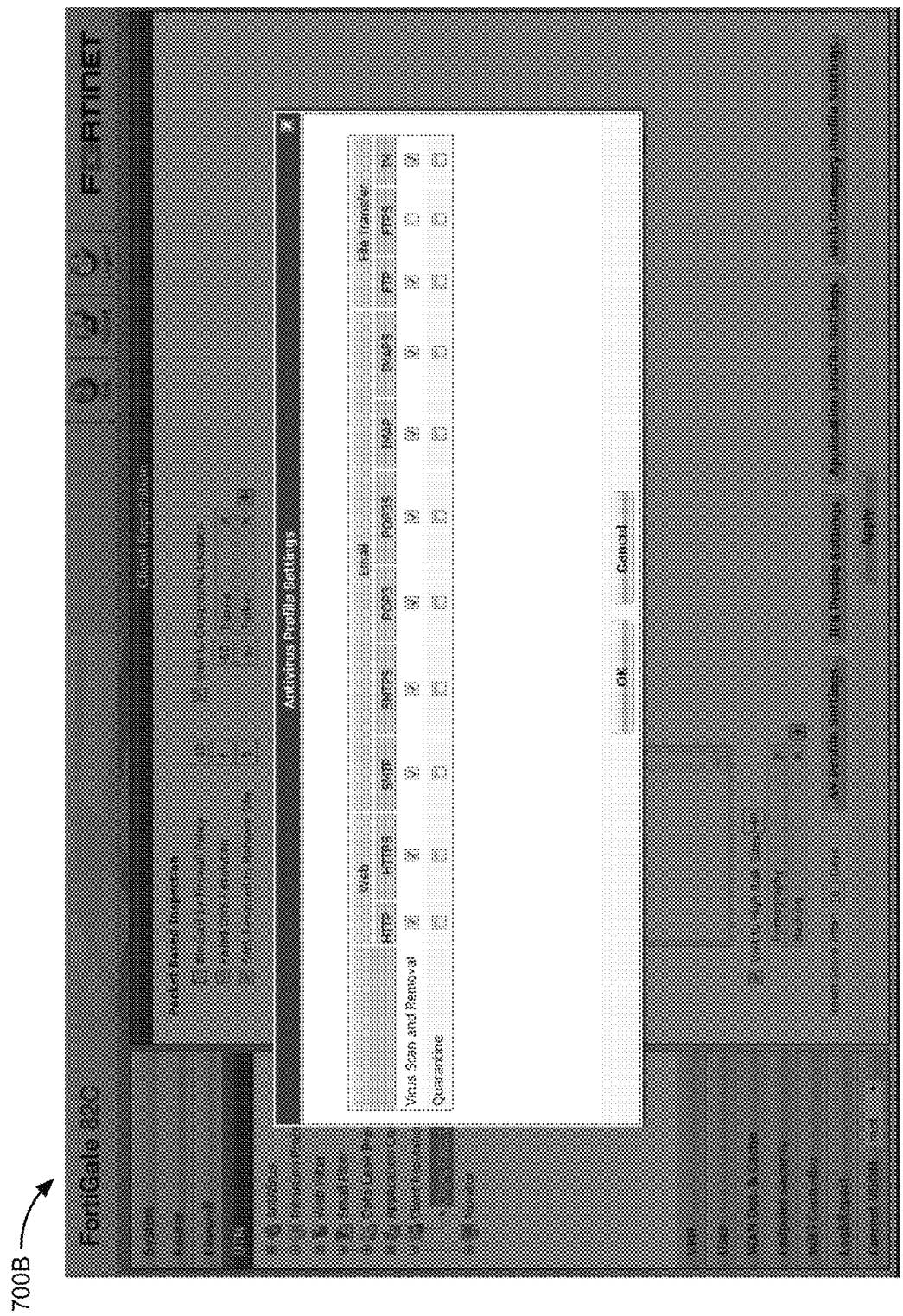

At FIG. 7A, an exemplary GUI 700A for configuring client reputation monitoring/scoring is shown. GUI 700A includes selected policies for accessing, scoring and otherwise determining a reputation of one or more clients. Further, filter tabs for removal or addition of more policies is also included. In addition to tabs for policies, tabs for scores corresponding to each policy are provided. GUI 700A enables a user to customize the policies and scores for assessment of reputation. Via GUI 700A, the user is also able to set the policies and scores for a fixed period of time. For example, reputation scores may be reset at a predetermined or configurable interval of time, such as every X days (e.g., 1, 5, 7, 10, 14 or 30).

GUI 700A enables a user to manage specific profiles by selecting a settings tab corresponding to the specific profile. For example, a user may select tab for Anti-Virus settings, resulting in GUI 700B illustrated in FIG. 7B. GUI 700B enables the user to manage settings for Anti-Virus scanning. The user has choice to select and de-select the options according to his/her preferences.

Figure 7C:
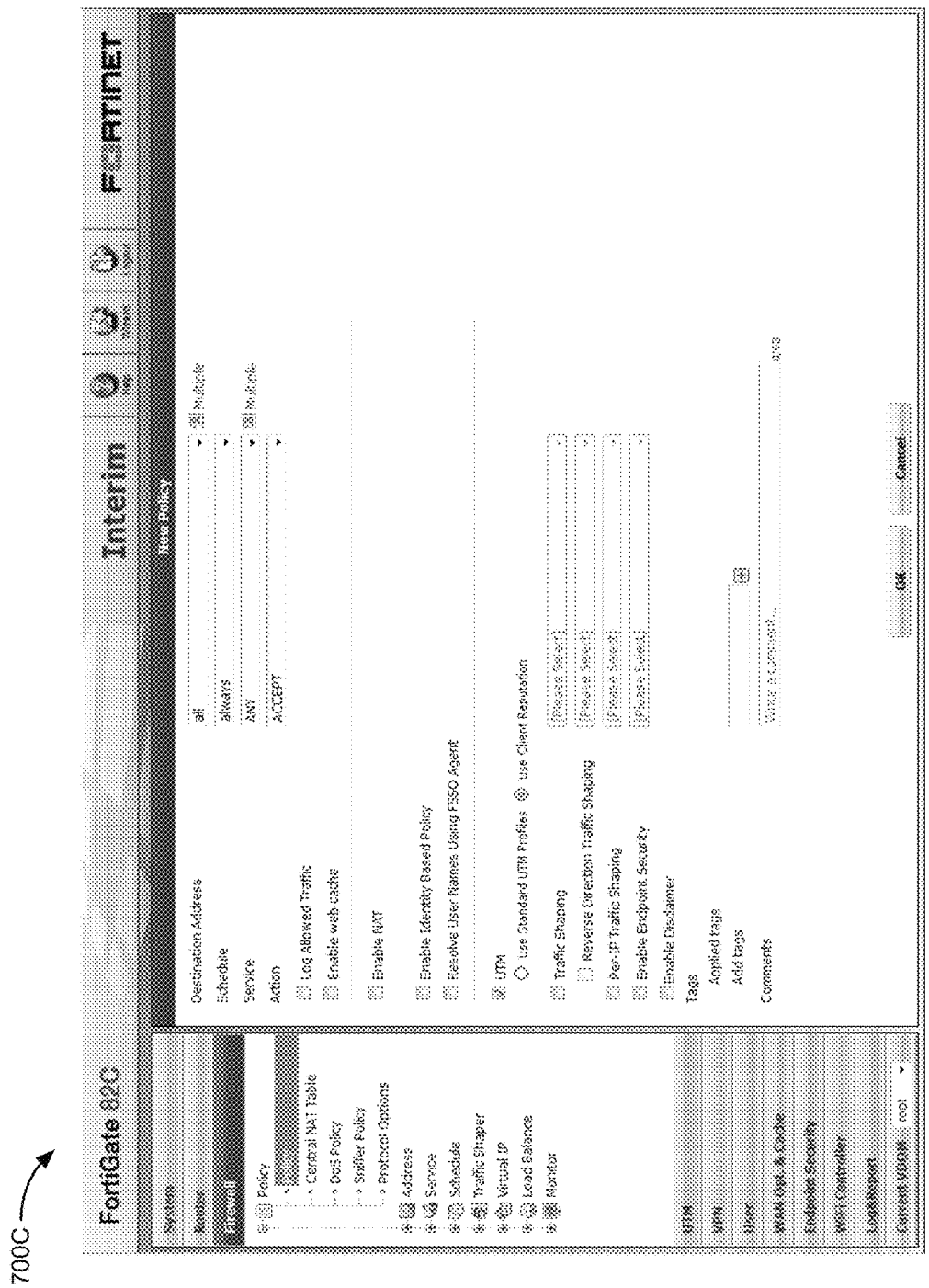

At FIG. 7C, an exemplary GUI 700C corresponding to selection of pre-defined profile is shown. For example, a Unified Threat Management (UTM) profile is selected in GUI 700C. The UTM profile includes various sub categories such as, 'Antivirus', 'Intrusion Protection', 'Web filter', 'Email filter', and 'Client reputation.' Each sub category may further include options which define policies or criteria related to network security. In a scenario, when a user chooses one policy, simultaneous use of another policy may be prohibited.

Figure 7D:
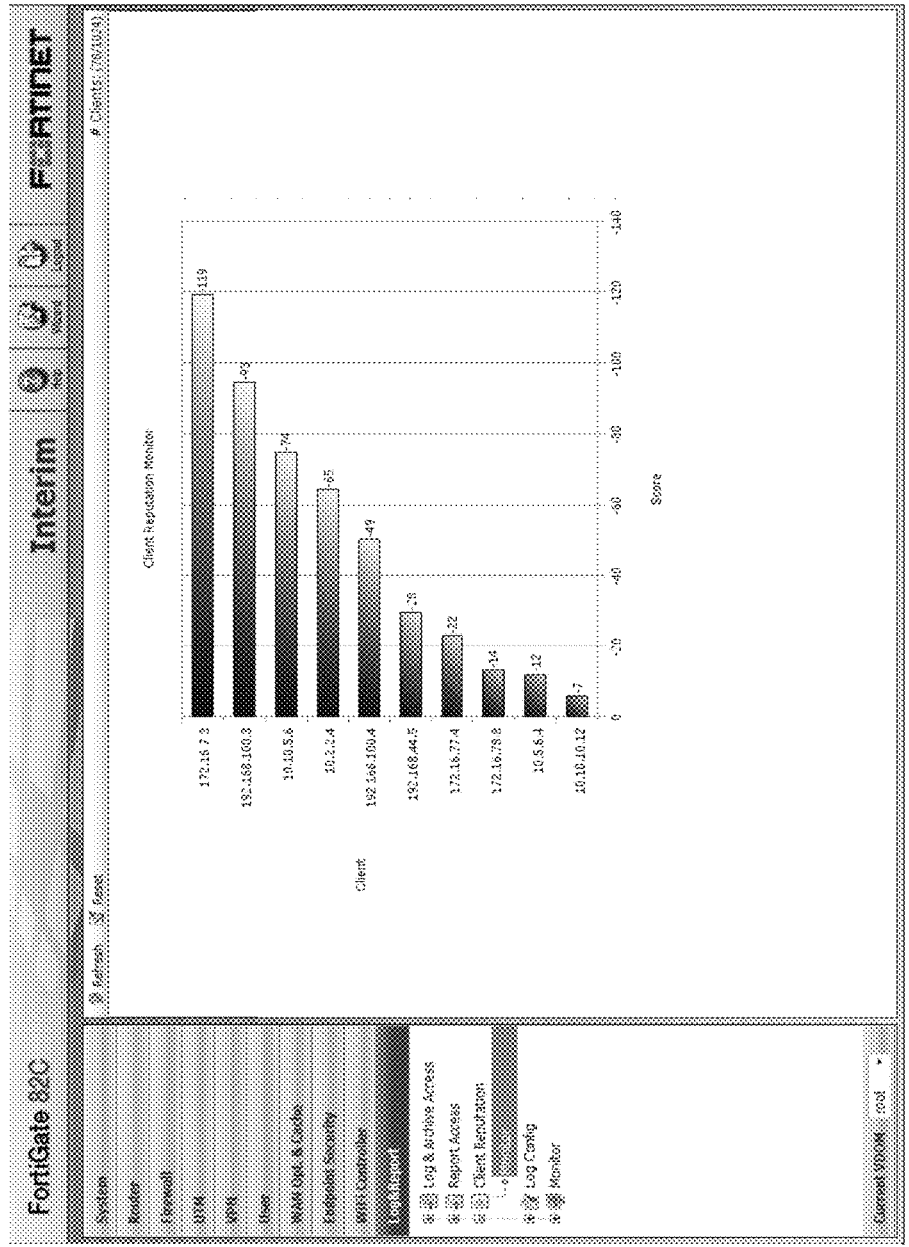

Once policies and scores associated with reputation of a client have been selected and implemented, then logs for monitoring reputation are maintained. FIG. 7D illustrates screens for demonstrating reports corresponding to the logs in GUI 700D. Bar charts illustrating aggregate score of multiple clients are shown. The clients with higher negative score may be considered as malicious resources. Therefore, a collective view of multiple clients in a network may be viewed and assessed.

Figure 7E:
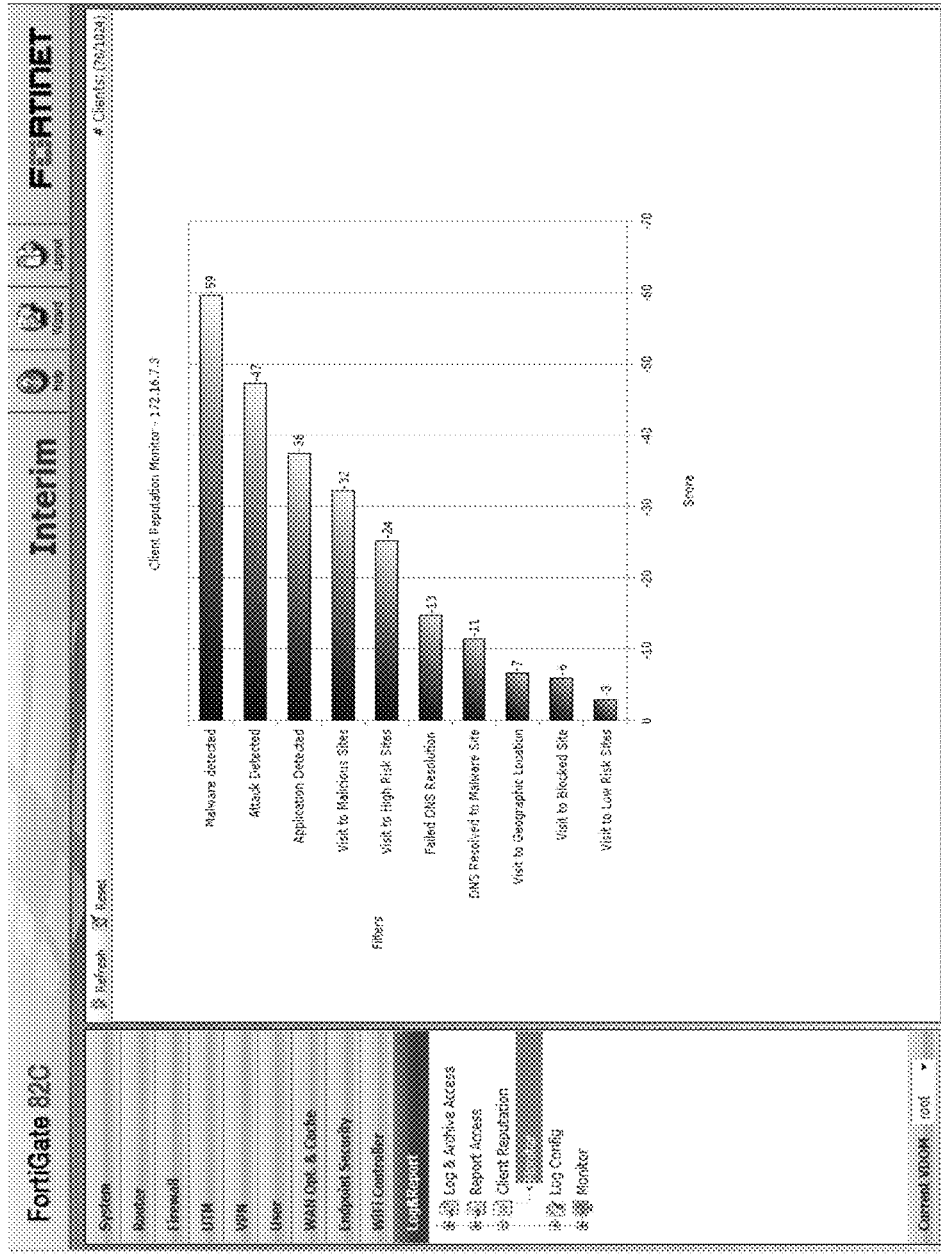

Any of the clients may be selected to view detailed scoring of the client. Upon selection a GUI 700E as shown in FIG. 7E may be demonstrated. GUI 700E shows a bar chart illustrating scores corresponding to multiple policies. In an embodiment, a log of malware activities may be displayed in form of a table along with the bar chart. The user may further view information related to a malware activity such as, malware activity name and protocol. Therefore, the bar charts or tables give information that indicates how the current reputation score of the selected client was derived.

Figure 8A:
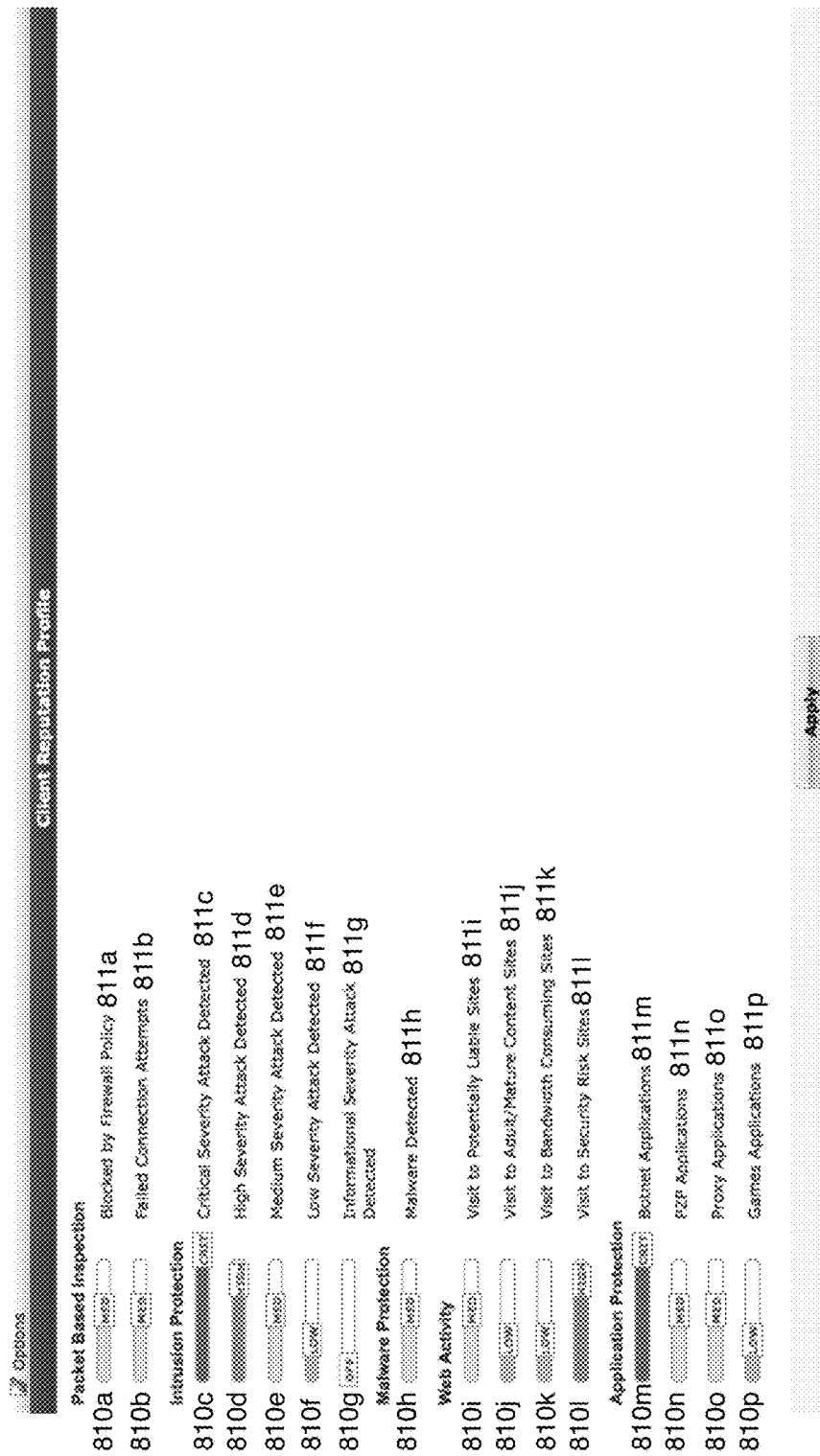
FIGS. 8A-8B illustrate exemplary graphical user interface pages to support an alternative configuration method in accordance with an embodiment of the present invention.
Figure 8B:
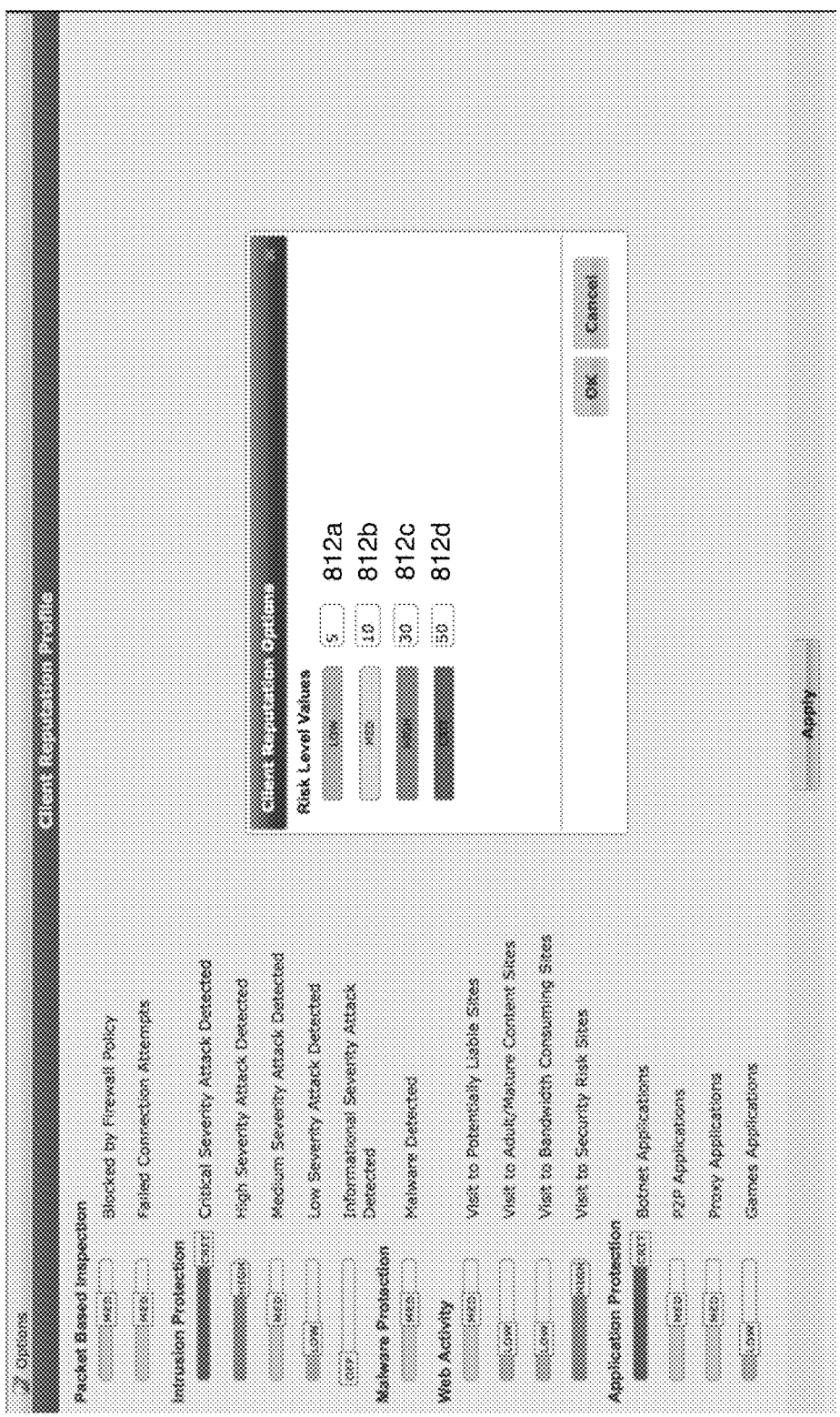

FIGS. 8A-8B illustrate exemplary graphical user interface pages to support an alternative configuration method in accordance with an embodiment of the present invention. In the present example, sliders 810a-p may be used to set the level of risk perceived by the user (or network administrator) across a range of threats 811a-p. Each threat 811a-p is assigned a risk level (e.g., none/off, low, medium, high or critical) by way of its corresponding slider 810a-p.

As shown in FIG. 8B, the sliders 810a-p (via scores assigned to the risk levels 812a-d) relate directly to the score assigned to a given client upon detection of the particular activity/behavior. According to the settings depicted, when a low risk level activity/behavior is observed, 5 points are added to the client's reputation score, when a medium risk level activity/behavior is observed, 10 points are added to the client's reputation score, when a high risk level activity behavior is observed, 30 points are added to the client's reputation score and when a critical risk level activity/ behavior is observed, 50 points are added to the client/s reputation score. The network administrator may edit the point values associated with risk levels as deemed appropriate for the particular context.

Various embodiments of the present disclosure enable efficient detection of malicious resources in a network. Behavior of the clients in the network is observed over a period of time based on multiple policies. Therefore, any changes in behavior with time can be instantly recorded. As various policies and scores associated with the policies are adjusted by a user, any adjustment based on change in network configuration may be accounted. Further, policies going obsolete may be easily removed. Policies may be selected to address targeted attacks in the network as well. In addition, timely reporting of reputation of clients is provided to the user to manage security threats. The method and system enable automated observing of malware activities in the network and at the same time provide manual intervention for controlling the parameters. Therefore, an efficient technique is obtained for detecting of malicious resources in the network.

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method comprising:
maintaining, by a monitoring unit executing on a network security device protecting a private network, a plurality of policies in a form of rules, wherein each policy of the plurality of policies is configurable by a network administrator of the private network via a browser-based interface provided by the monitoring unit and specifies (i) a perceived risky activity of a plurality of perceived risky activities potentially indicative of malware activity and (ii) a corresponding score, wherein the plurality of perceived risky activities include bad connection attempts, interactions with a hosts in particular geographic locations external to the private network, interactions with undesired websites external to the private network and failed Domain Name Server (DNS) resolution requests;
observing, by the monitoring unit, activities relating to a plurality of monitored devices within the private network;
for each of the observed activities, assigning, by the monitoring unit, a score to the observed activity based upon a matching policy of the plurality of polices;
for each of the plurality of monitored devices, maintaining, by the monitoring unit, a current reputation score for the monitored device based upon the score and a historical score associated with the monitored device; and
classifying, by the monitoring unit, a monitored device of the plurality of monitored devices as potentially being a malicious resource based upon the current reputation score for the monitored device.

2. The method of claim 1, wherein the network security device comprises a gateway device within the private network.

3. The method of claim 2, further comprising actively snooping, by the monitoring unit, the private network for network communications initiated by the plurality of monitored devices and network communications directed to the plurality of monitored devices and storing information associated with the network communications for analysis and scoring.

4. The method of claim 1, further comprising maintaining, by the monitoring unit, a log of the perceived risky activities.

5. The method of claim 4, further comprising responsive to a drill-down request by the network administrator in relation to a particular monitored device of the plurality of monitored devices, providing, by the monitoring unit, information from the log indicative of how the current reputation score for the particular monitored device was derived.

6. The method of claim 1, further comprising tracking a geo-location for a network communication initiated by the monitored device by performing a database lookup for a destination Internet Protocol (IP) address associated with the network communication.

7. The method of claim 1, further comprising monitoring application activity for the monitored device by activating one or more of application launch control and application activity control within the monitored device.

8. The method of claim 1, wherein said observing includes one or more of performing packet-based inspection of network communications to or from the monitored device, performing flow-based inspection of the network communications and performing proxy based inspection of the network communications.

9. The method of claim 8, wherein the packet-based inspection includes identifying one or more of indications relating to blockage by a firewall associated with the network, indications regarding failed Domain Name Server (DNS) resolution and indications regarding DNS resolution to undesired sites external to the private network.

10. The method of claim 8, wherein the flow-based inspection includes observing the monitored device accepting a connection request from a device located outside of the private network.

11. The method of claim 1, further comprising for each of the plurality of monitored devices, resetting, by the monitoring unit, the historical score on a periodic basis.

12. The method of claim 11, wherein the periodic basis is configurable by the network administrator.

13. The method of claim 1, further comprising presenting, by the monitoring unit to the network administrator of the private network, the current reputation scores for the plurality of monitored devices.

14. A network monitoring device for monitoring activities within a private network comprising:
a processor;
a memory having stored therein one or more routines; and
wherein, when executed by the processor, the one or more routines perform a method of client reputation monitoring comprising:
maintaining a plurality of policies in a form of rules, wherein each policy of the plurality of policies is configurable by a network administrator of the private network via a browser-based interface provided by the monitoring unit and specifies (i) a perceived risky activity of a plurality of perceived risky activities potentially indicative of malware activity and (ii) a corresponding score, wherein the plurality of perceived risky activities include bad connection attempts, interactions with a hosts in particular geographic locations external to the private network, interactions with undesired websites external to the private network and failed Domain Name Server (DNS) resolution requests;
observing activities relating to a plurality of monitored devices within the private network;

for each of the observed activities, assigning a score to the observed activity based upon a matching policy of the plurality of polices;

for each of the plurality of monitored devices, maintaining a current reputation score for the monitored device based upon the score and a historical score associated with the monitored device; and classifying a monitored device of the plurality of monitored devices as potentially being a malicious resource based upon the current reputation score for the monitored device.

15. The network monitoring device of claim 14, wherein the network monitoring device comprises a gateway device within the private network.

16. The network monitoring device of claim 15, wherein the method further comprises actively snooping the private network for network communications initiated by the plurality of monitored devices and network communications directed to the plurality of monitored devices and storing information associated with the network communications for analysis and scoring.

17. The network monitoring device of claim 14, wherein the method further comprises tracking a geo-location for a network communication initiated by the monitored device by performing a database lookup for a destination Internet Protocol (IP) address associated with the network communication.

18. The network monitoring device of claim 14, wherein the method further comprises monitoring application activity for the monitored device by activating one or more of application launch control and application activity control within the monitored device.

19. The network monitoring device of claim 14, wherein said observing includes one or more of performing packet-based inspection of network communications to or from the monitored device, performing flow-based inspection of the network communications and performing proxy based inspection of the network communications.

20. The network monitoring device of claim 19, wherein the packet-based inspection includes identifying one or more of indications relating to blockage by a firewall associated with the private network, indications regarding failed Domain Name Server (DNS) resolution and indications regarding DNS resolution to undesired sites external to the private network.

21. The network monitoring device of claim 19, wherein the flow-based inspection includes observing the monitored device accepting a connection request from a device located outside of the private network.

22. The network monitoring device of claim 14, wherein the method further comprises for each of the plurality of monitored devices, resetting the historical score on a periodic basis.

23. The network monitoring device of claim 14, wherein the method further comprises presenting to the network administrator the current reputation scores for the plurality of monitored devices.

* * * * *